(12) United States Patent
Lee

(10) Patent No.: US 12,545,369 B2
(45) Date of Patent: Feb. 10, 2026

(54) MARINE WASTE DISPOSAL APPARATUS USING SATELLITE IMAGE

(71) Applicant: CONTEC CO., LTD., Daejeon (KR)

(72) Inventor: Sunghee Lee, Sejong-si (KR)

(73) Assignee: CONTEC CO., LTD., Daejeon (KR)

( * ) Notice: Subject to any disclaimer, the term of this patent is extended or adjusted under 35 U.S.C. 154(b) by 264 days.

(21) Appl. No.: 18/345,685

(22) Filed: Jun. 30, 2023

(65) Prior Publication Data

US 2024/0166310 A1    May 23, 2024

Related U.S. Application Data

(63) Continuation of application No. PCT/KR2022/018718, filed on Nov. 24, 2022.

(30) Foreign Application Priority Data

Nov. 23, 2022   (KR) ........................ 10-2022-0158322

(51) Int. Cl.
     *B63B 17/06*      (2006.01)
     *B63B 49/00*      (2006.01)
     (Continued)

(52) U.S. Cl.
     CPC ............. *B63B 17/06* (2013.01); *B63B 49/00* (2013.01); *B63B 79/15* (2020.01); *B63B 2213/02* (2013.01); *G01C 13/002* (2013.01)

(58) Field of Classification Search
     CPC ......... B63B 79/15; B63B 17/06; B63B 49/00; B63B 2213/02; B63B 35/32; G01C 21/3852; G01C 13/002; G01W 1/02; G06Q 50/26; G06Q 50/40; G06T 2207/10032; G06T 2207/20128; Y02W 30/20
See application file for complete search history.

(56) References Cited

U.S. PATENT DOCUMENTS

| | | | |
|---|---|---|---|
| 11,290,363 B2 * | 3/2022 | DeWeert | ................ H04L 43/50 |
| 2009/0210388 A1 * | 8/2009 | Elson | ...................... G06F 16/29 |

(Continued)

FOREIGN PATENT DOCUMENTS

| | | | | |
|---|---|---|---|---|
| CN | 113077133 A | * | 7/2021 | |
| CN | 113126122 A | * | 7/2021 | ............. G01S 17/90 |

(Continued)

OTHER PUBLICATIONS

International Search Report issued in PCT/KR2022/018718; mailed Aug. 17, 2023.

*Primary Examiner* — Cuong H Nguyen
(74) *Attorney, Agent, or Firm* — Studebaker Brackett PLLC

(57) ABSTRACT

A marine waste disposal apparatus according to an embodiment of the present invention comprise a satellite image processing unit that receives satellite images to identify and locate marine waste, and generates a map of marine waste, a waste change reasoning unit for receiving at least one or more pieces of information selected from the group consisting of tide, temperature, wind direction/speed, seawater flow, and wave height information to reason changes in the marine waste map, a ship control and management units that control general ships and control waste disposal ships based on marine waste maps.

5 Claims, 6 Drawing Sheets

(51) Int. Cl.
*B63B 79/15* (2020.01)
*G01C 13/00* (2006.01)

(56) References Cited

U.S. PATENT DOCUMENTS

| | | | | |
|---|---|---|---|---|
| 2016/0125338 | A1* | 5/2016 | Serageldin | G06Q 10/06313 |
| | | | | 705/7.23 |
| 2019/0197325 | A1* | 6/2019 | Reiley | G08B 13/19602 |
| 2020/0017177 | A1* | 1/2020 | Eyal | G05D 1/43 |
| 2021/0156692 | A1* | 5/2021 | Moriwaki | G01C 21/203 |
| 2021/0306248 | A1* | 9/2021 | DeWeert | H04L 43/50 |
| 2022/0250127 | A1* | 8/2022 | Dhariya | B29B 17/0412 |

FOREIGN PATENT DOCUMENTS

| | | | | | |
|---|---|---|---|---|---|
| CN | 117035750 | A | * | 11/2023 | E02B 15/10 |
| CN | 119795941 | A | * | 4/2025 | G01D 7/02 |
| DE | 102009032364 | B4 | * | 7/2012 | B63G 8/00 |
| JP | 2025513130 | A | * | 4/2025 | G06Q 50/40 |
| KR | 100742319 | B1 | * | 7/2007 | B63B 19/00 |
| KR | 10-1513591 | B1 | | 4/2015 | |
| KR | 10-2021-0061848 | A | | 5/2021 | |
| KR | 10-2264416 | B1 | | 6/2021 | |
| KR | 102353056 | B1 | * | 1/2022 | |
| KR | 10-2414929 | B1 | | 7/2022 | |
| KR | 20250040136 | A | * | 3/2025 | H05B 1/023 |
| KR | 102840235 | B1 | * | 7/2025 | G05D 1/622 |
| TW | 1670470 | B | * | 9/2019 | B63B 49/00 |

* cited by examiner

MARINE WASTE DISPOSAL APPARATUS USING SATELLITE IMAGE

CROSS-REFERENCE TO RELATED APPLICATIONS

The present application is a Continuation of International Patent Application No. PCT/KR2022/018718, filed on Nov. 24, 2022, which is based upon and claims the benefit of priority to Korean Patent Application No. 10-2022-0158322 filed on Nov. 23, 2022. The disclosures of the above-listed applications are hereby incorporated by reference herein in their entirety.

TECHNICAL FIELD

The present invention relates to a marine waste disposal apparatus device using satellite images, and more particularly to a marine waste disposal apparatus that facilitates collection and disposal by treating wastes floating in the ocean.

RELATED ART

Environmental issues are one of the most problematic issues from the past to the present as mankind lives on earth. In particular, the pollution of the sea has been overlooked, but the sea, which occupies more than 70% of the entire earth, provides useful resources for humans and an environment for animals and plants to live.

However, with industrial development, pollution of the sea is becoming more serious day by day due to oil spill pollution caused by ship accidents and wastes flowing into the sea from the land.

More than 10% of ship accidents are caused by marine waste, and marine waste significantly reduces productivity of fisheries. Furthermore, it continues to cause damage that kills sea creatures and destroys their habitats.

Marine waste dumped into the sea refers to all waste in or on the sea, such as all waste that flows into the sea and is dumped from ships. Marine waste is classified into coastal waste, floating waste, and undersea waste according to the location of its distribution.

Coastal waste can often be monitored with the naked eye for management and collection, and the waste collected on the coast is estimated to be approximately 12,000 tons.

Contrary to coastal waste, which is relatively easy to collect because it is in contact with the land, floating waste on the sea is located at sea far from the land, so it must be moved by boat for collection, and depending on the amount of waste, heavy equipment is used in the middle of the sea. This entails the difficulty of collecting it.

In order to collect floating waste in the distant sea, it is common to take aerial photographs to understand the actual condition of floating waste to be collected.

There is a growing need to easily dispose of marine waste by identifying in advance the condition, place, and time of easy collection through satellite images.

An artificial satellite refers to an object capable of flying and moving around the earth along a predetermined circular or elliptical orbit. The artificial satellite may be launched after being mounted on a satellite launch vehicle, enter a predetermined orbit in outer space, and perform various predefined operations within the orbit. The artificial satellite rotates around the earth along its orbit, and exchanges data with various communication/electronic devices (eg, satellite antennas and set-top boxes connected thereto) on the ground and/or performs functions such as observing the surface of the earth.

A space ground station is installed on the ground to control (eg, monitor or control) satellites or phase launch vehicles and receive data collected by the satellites.

The space ground station performs communication with artificial satellites based on standardized frequencies and communication protocols, and transmits control signals for specific operations (eg, shooting) to the satellites or data acquired by the satellites based on specific operations (eg, image data of the ground surface) may be received and various processes may be performed.

DETAILED DESCRIPTION

Technical Object

An object of the present invention is to provide a system capable of efficiently collecting and disposing marine waste using satellite images.

An object of the present invention is to provide a system capable of collecting marine waste considering the ever-changing marine conditions and a previously predicted collection schedule and amount.

Technical Solution

According to an aspect of at least one example embodiment, there is provided a marine waste disposal apparatus including a satellite image processing unit that receives satellite images to identify and locate marine waste, and generates a map of marine waste, a waste change reasoning unit for receiving at least one or more pieces of information selected from the group consisting of tide, temperature, wind direction/speed, seawater flow, and wave height information to reason changes in the marine waste map, a ship control and management units that control general ships and control waste disposal ships based on marine waste maps.

The satellite image processing unit may include a pre-processing module that performs pre-processing on the received marine satellite image, an object recognition module that recognizes objects captured from marine satellite images and a waste map generating module that generates a marine waste map using the marine waste cluster information recognized through satellite images.

The waste change reasoning unit may include an information receiving module for receiving at least one piece of marine information selected from the marine information group consisting of tidal information, temperature information, wind direction/speed information, seawater flow information, and wave height information predicted at the location of marine waste from the marine information service system, a waste capacity reasoning module for reasoning the capacity of waste considering the waste accumulation area derived from the waste map and a map change reasoning module for predicting the movement of wastes from the marine information received through the information receiving module and generating a changed marine waste reasoning map.

The map change reasoning module may generate a marine waste reasoning map by reasoning the movement path of marine waste through deep learning using satellite images.

The ship control and management units may include a ship navigation information receiving module that receives navigation information of a general ship sailing or planning to sail to a location near wastes indicated on a marine waste map or a marine waste reasoning map, a waste disposal ship schedule module that creates a schedule for processing marine waste by utilizing the location and ship information of the marine waste disposal ship and a ship control and management module that transmits safety alerts due to waste to general ships or controls the departure, operation, and entry of marine waste disposal ships.

According to an aspect of at least one example embodiment, there is provided a method of disposing marine waste using satellite image by the marine waste disposal apparatus including the step of receiving a satellite image, the step of pre-processing the received satellite image, the step of generating a map of marine waste by recognizing waste from satellite images, the step of generating a marine waste reasoning map by receiving at least one ocean information selected from the group consisting of tide, temperature, wind direction/speed, seawater flow, and wave height information, the step of generating a schedule of a marine waste disposal ship based on a marine waste reasoning map.

Effect of Invention

According to the marine waste disposal apparatus according to an embodiment of the present invention, it is possible to dispose of marine waste that is difficult to collect because it is far from the land in a state where it can be collected.

In addition, it is possible to identify the movement route of marine waste in real time, and to identify the generation area and inflow route of marine waste.

In addition, since satellite images are used, regular shooting and marine waste management are possible regardless of time or place.

In addition, it is possible to predict the amount of waste and easily determine input resources for collection through artificial intelligence algorithms.

DETAILED DESCRIPTION

Figure 1:
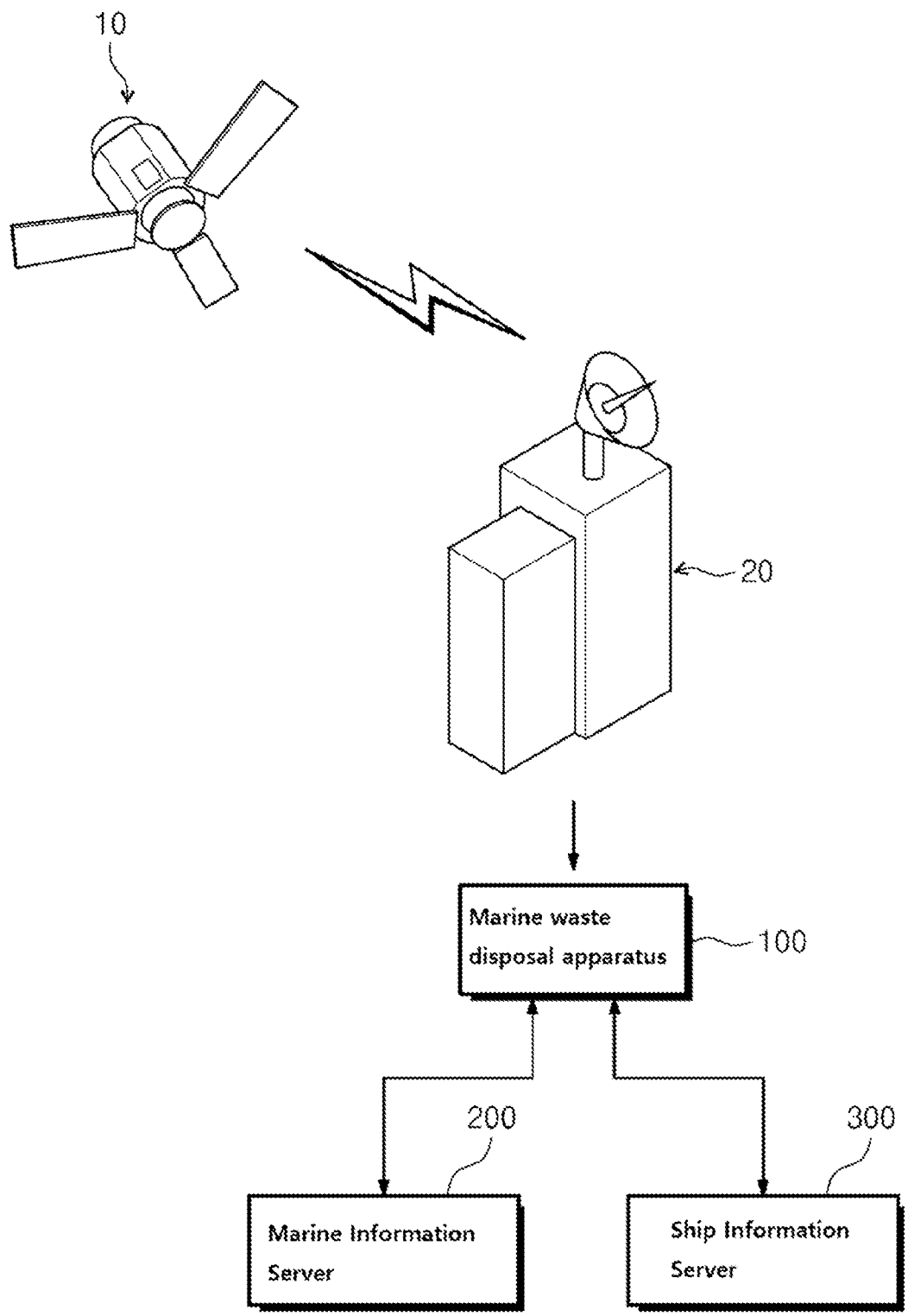
FIG. 1 is a conceptual diagram of an overall system connection according to an embodiment.

Specific structural or functional descriptions related to example embodiments according to the concept of the present invention set forth herein are simply provided to explain the example embodiments according to the concept of the present invention and the example embodiments according to the concept of the present invention may be implemented in various forms and are not limited to the example embodiments described herein.

Various modifications may be made to the example embodiments according to the concept of the present invention. Therefore, the example embodiments are illustrated in the drawings and are described in detail with reference to the detailed description. However, the example embodiments are not construed as being limited to specific forms and should be understood to include all changes, equivalents, and replacements within the idea and the technical scope of the present invention.

Although terms of "first," "second," and the like may be used to explain various components, the components are not limited to such terms. These terms are used only to distinguish one component from another component. For example, a first component may be referred to as a second component, or similarly, the second component may be referred to as the first component within the scope of the present invention.

When it is mentioned that one component is "connected" or "joined" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, the example embodiments will be described in detail with reference to the accompanying drawings. However, the scope of the claims is not limited to or restricted by such example embodiments. Like reference numerals refer to like components throughout.

FIG. 1 is a conceptual diagram of an overall system connection according to an embodiment.

As shown in FIG. 1, the marine waste disposal apparatus 100 according to an embodiment of the present invention receives an image captured by a satellite 10 from a ground station 20 and receives a satellite image transmitted from the ground station 20. Unlike this, the marine waste disposal apparatus 100 may directly receive images from the satellite 10.

The marine waste disposal apparatus 100 according to an embodiment of the present invention receives weather information and marine information from the weather and marine information server 200.

In the case of Korea, weather information can be received through the Korea Meteorological Administration server and marine information can be received through the Ocean Information System server. Overseas, information may be received from organizations dealing with similar information.

In addition, the marine waste disposal apparatus 100 according to an embodiment of the present invention receives ship information and ship operation information from the ship information server 300. In particular, information on a waste collection ship capable of collecting marine waste may be received.

Here, the ship information includes identification information such as the name of the ship, loading capacity, anchorage, captain, owner, and the like, and ship operation information includes information such as destination and navigation route.

The marine waste disposal apparatus 100 according to an embodiment of the present invention is a connection device that can locate and process marine waste using satellite images, and mainly processes floating marine waste.

Figure 2:
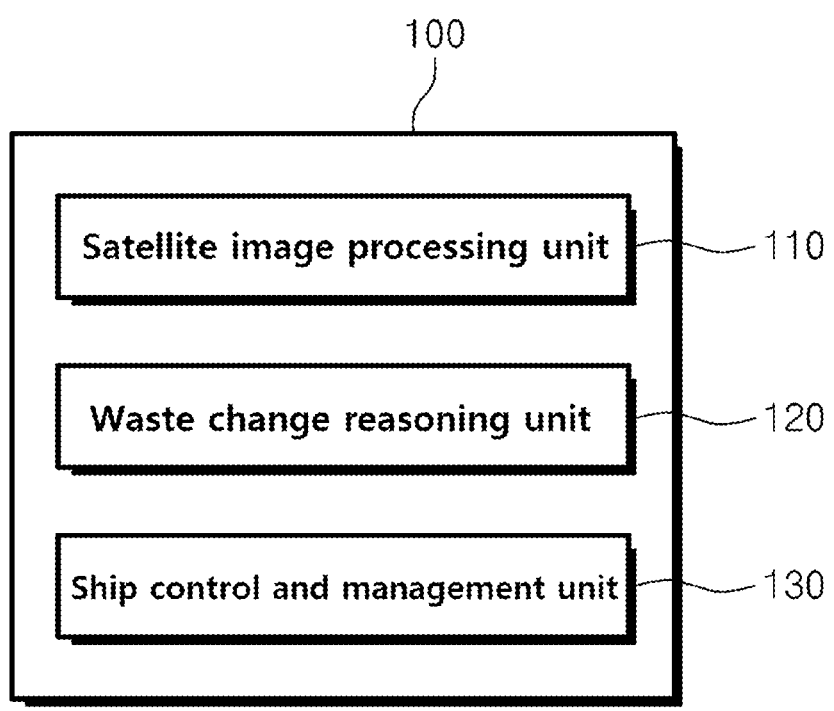
FIG. 2 is a functional block diagram of a marine waste disposal apparatus according to an embodiment.

FIG. 2 is a functional block diagram of a marine waste disposal apparatus according to an embodiment.

As shown in FIG. 2, the marine waste disposal apparatus 100 according to an embodiment of the present invention includes a satellite image processing unit 110 that receives a satellite image, identifies and locates marine waste, and generates a map of the marine waste. waste change reasoning unit 120 for reasoning a change in the marine waste map by receiving at least one or more pieces of information selected from the group consisting of tide, temperature, wind direction/speed, seawater flow, and wave height information and controlling a general ship, and a ship control and management unit 130 that controls the waste disposal ship based on the marine waste map.

The marine waste disposal apparatus 100 according to an embodiment of the present invention may be implemented as a hardware component, a software component, and/or a combination of hardware components and software components.

For example, the devices and components constituting the devices described in the embodiments include a processor, a controller, an arithmetic logic unit (ALU), a digital signal processor, a microcomputer, a field programmable array (FPA), and a PLU. It can be implemented using one or more general purpose or special purpose computers, such as a programmable logic unit, microprocessor, or any other device capable of executing and responding to instructions.

The satellite image processing unit 110, the waste change reasoning unit 120, and the ship control and management unit 130 constituting the marine waste disposal apparatus 100 according to an embodiment of the present invention have a separate independent operating system (OS) and It may run one or more software applications running on an operating system.

In addition, each of these components may access, store, manipulate, process, and create data in response to execution of the software.

It can be seen that the marine waste disposal apparatus 100 according to an embodiment of the present invention may be used as one processing unit, but may include a plurality of processing units and/or a plurality of types of processing elements.

For example, the marine waste disposal apparatus 100 may include a plurality of processors or one processor and one controller. Other processing configurations are also possible, such as parallel processors.

Software may include a computer program, code, instructions, or a combination of one or more of the foregoing, which configures a processing device to operate as desired or processes independently or collectively. You can command the device.

Software and/or data may be any tangible machine, component, physical device, virtual equipment, computer storage medium or device, intended to be interpreted by or provide instructions or data to a processing device, or may be permanently or temporarily embodied in a transmitted signal wave.

The software may be distributed among networked computer systems and stored or executed in a distributed manner. Software and data may be stored on one or more computer readable media.

Figure 3:
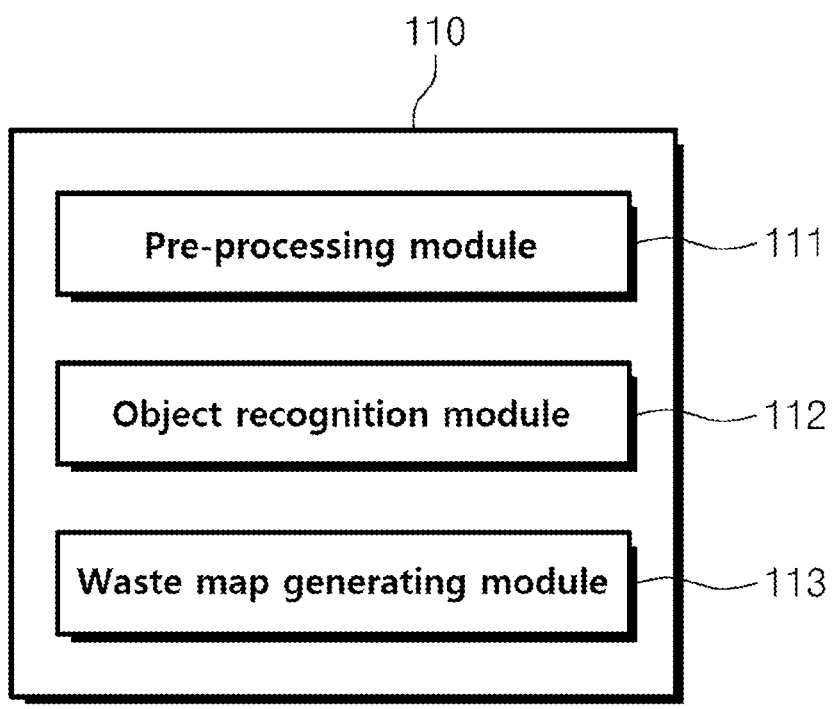
FIG. 3 is a detailed functional block diagram of a satellite image processing unit according to an embodiment.

FIG. 3 is a detailed functional block diagram of a satellite image processing unit according to an embodiment.

As shown in FIG. 3, the satellite image processing unit 110 includes a pre-processing module 111 for pre-processing the received marine satellite image, an object recognition module 112 for recognizing an object photographed from the marine satellite image, and a waste map generating module 113 for generating a marine waste map using marine waste community information recognized through satellite images.

The pre-processing module 111 is a module that performs a process of converting a satellite image into a usable image. Satellite images acquire images of various wavelength regions, such as infrared and microwave regions, as well as visible light wavelength regions. When the solar energy reflected from the ground enters the observation sensor of the satellite, the brightness of the light detected inside the sensor is stored as one pixel, and the pixels with each independent brightness value are combined to form one image with a continuous light and shade. It consists of The satellite image obtained in this way goes through pre-processing processes such as radiation correction, atmospheric correction, orthometric correction, geometric correction, etc., and a detailed description of each correction will be omitted.

The object recognition module 112 extracts an object from the preprocessed marine satellite image. In particular, the object recognition module 112 according to an embodiment of the present invention recognizes waste floating in the sea. The object recognition module 112 may directly recognize an object through a satellite image, or may recognize floating waste by synthesizing whether the object moves or changes in size through a plurality of satellite images.

The waste map generating module 113 utilizes cluster information of marine wastes recognized in the ocean to generate a waste map displaying marine wastes gathered here and there. The generated waste map is updated through satellite images captured regularly or irregularly, and the updated information is stored in the marine waste disposal apparatus 100 in a time-specified state.

An image captured by an artificial satellite is input to the marine waste treatment device 100 according to an embodiment of the present invention, and the satellite image processing unit 110 pre-processes the input satellite image, recognizes the marine waste as an object, and generates a waste map.

In more detail, the satellite image processing unit 110 pre-processes the input satellite image to generate a standard image, and processes the generated standard image into a utilization image classified into a plurality of categories in consideration of the utilization purpose to generate SAR (Synthetic Aperture Radar) image or EO (Electro-optical) image is classified into at least one image, and by utilizing a pre-stored analysis algorithm, either of SAR(Synthetic Aperture Radar) image or EO (Electro-optical) image is classified. Images are processed into utilization images or processed into utilization images by combining them. Furthermore, a waste map is generated using the generated utilization image.

Figure 4:
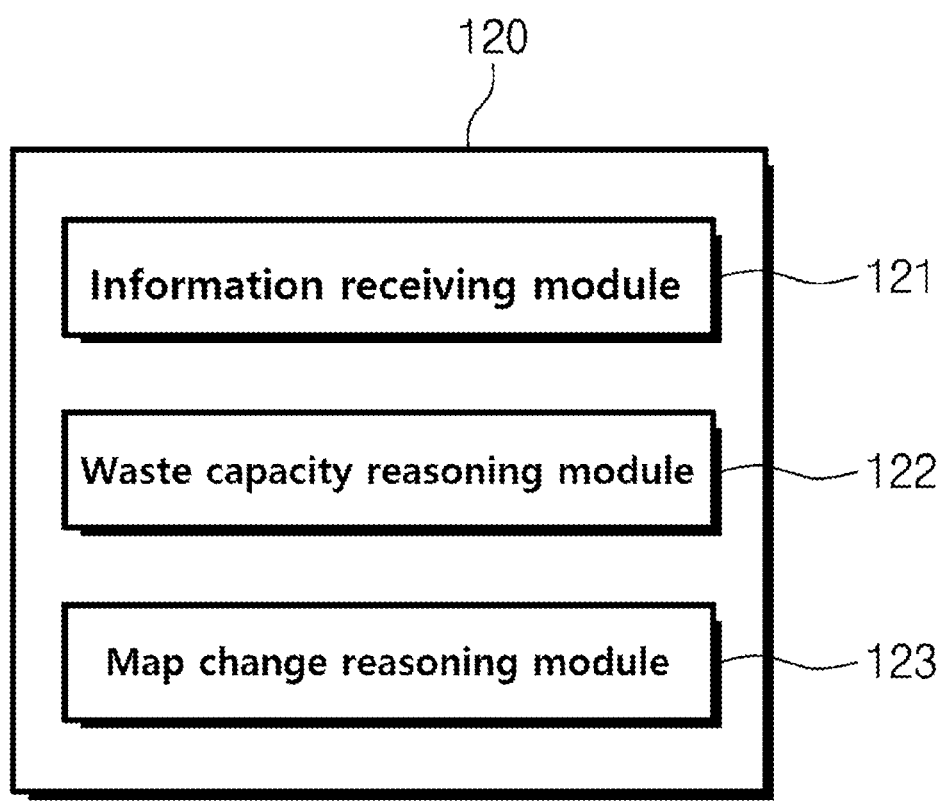
FIG. 4 is a detailed functional block diagram of a waste change reasoning unit according to an embodiment.

FIG. 4 is a detailed functional block diagram of a waste change reasoning unit according to an embodiment.

As shown in FIG. 4, the waste change reasoning unit 120 includes an information receiving module 121, a waste capacity reasoning module 122 and a map change reasoning module 123.

The information receiving module 121 receives at least one or more information selected from the group consisting of tidal information, temperature information, wind direction/speed information, seawater flow information, and wave height information predicted at the location of marine waste from the marine information service system. The marine information service system is a system that provides various information related to the real-time marine. In Korea, the National Maritime Survey provides this information. The information receiving module 121 selects marine information that may cause movement or location change of marine waste from the location of the marine waste, and receives information predicted from the location of the marine waste.

The waste capacity reasoning module 122 reasons the weight of the waste based on the area occupied by the waste in the waste map generated by the satellite image processing unit 110 in advance.

Here, the unit for reasoning the weight of the waste may be reasoned for each waste group, or the weight of the waste may be reasoned within a preset area. In particular, it is possible to reason the weight of waste only in territorial seas over which a specific country has management authority, or the weight of wastes in a certain area in the high seas.

The map change reasoning module 123 predicts the movement of waste from marine information and generates a changed marine waste reasoning map. Through deep learning, the movement of marine waste, movement distance, direction, etc. the map change reasoning module 12 generate a marine waste reasoning map, which is an reasoned prediction map.

For example, when it is predicted that some of the waste in a specific area will move to another area through wind direction/speed and seawater flow information by typhoon among the predicted marine information in the waste map generated through satellite imagery, if the area is within the territorial waters of a specific country or is a point where collection is easy, you can take action quickly through a waste disposal ship.

If it is not disposed at a specific time in another area, or if the movement of a waste cluster to another area where collection is difficult due to changes in tides or wind direction/speed is predicted, the prediction information and prediction time of movement to another area will carry weight In particular, generating a marine waste reasoning map through such predictive information is to check the waste clusters in the images taken at regular intervals through satellite images and check the direction of movement due to drift, but the waste clusters at the time of movement for collection It can be reduced the risk of drifting to a different location from the location in the satellite image.

Figure 5:
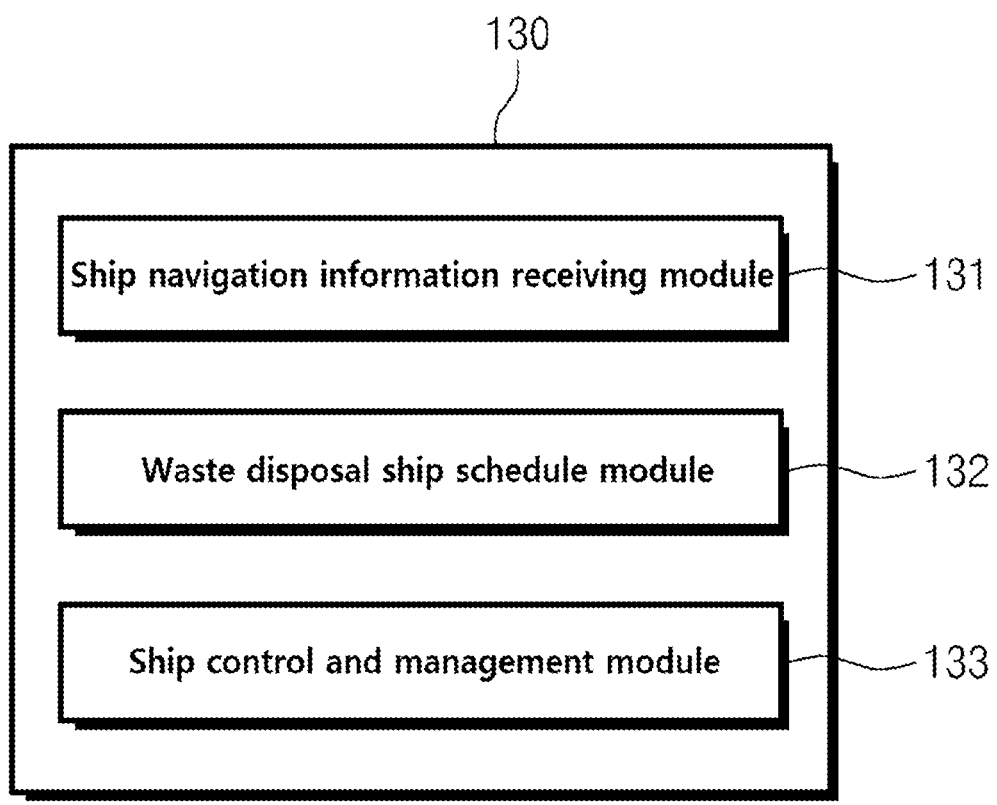
FIG. 5 is a detailed functional block diagram of a ship control and management unit according to an embodiment.

FIG. 5 is a detailed functional block diagram of a ship control and management unit according to an embodiment.

Figure 6:
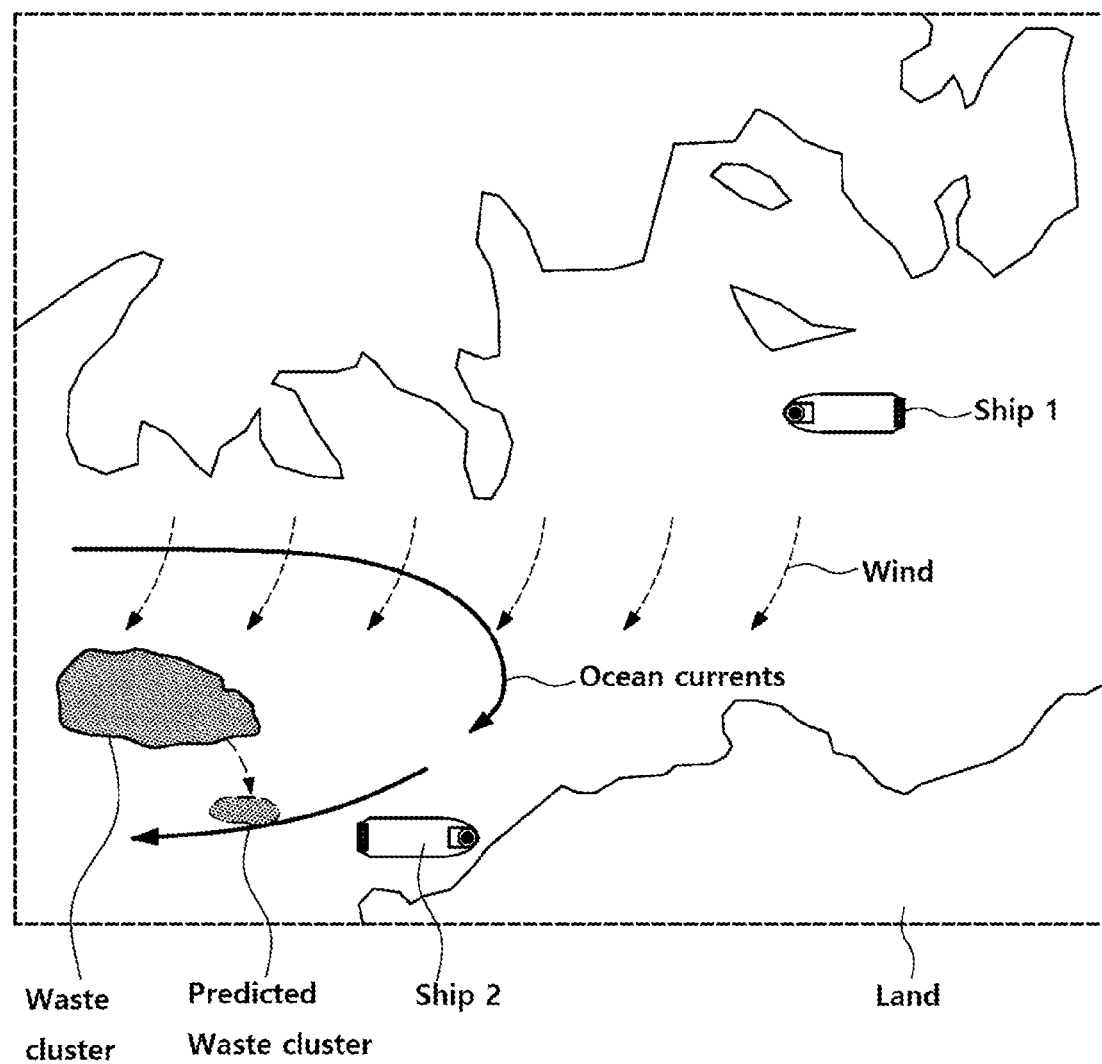
FIG. 6 is an exemplary view of system operation according to an embodiment.

FIG. 6 is an exemplary view of system operation according to an embodiment.

As shown in FIG. 5, the ship control and management unit 130 according to an embodiment of the present invention includes a ship navigation information receiving module 131, a waste disposal ship schedule module 132, and a ship control and management module 133.

The ship navigation information receiving module 131 is receive voyage information of a general ship that sails or plans to navigate the location near the waste displayed on the marine waste map generated through the satellite image or the marine waste reasoning map generated by the map change reasoning module 123.

Such voyage information becomes data through which safety alerts can be transmitted from the ship control and management module 133 in order to prevent an engine failure or an accident that may occur due to waste in a general ship.

The waste disposal ship schedule module 132 creates a schedule for processing marine waste by utilizing the position and ship information of the marine waste disposal ship.

Through the marine waste map or the marine waste reasoning map, a schedule of the waste disposal ship is created based on the actual or predicted location of the marine waste.

As described above, the vessel control and management module 133 transmits a safety alert of the ship or controls the departure, operation, and arrival of the marine waste disposal ship. Departure is instructed according to the schedule generated by the waste disposal ship schedule module 132, and the waste capacity is reasoned by the waste capacity reasoning module 122, considering the working time, travel time, etc. based on the waste capacity and collection capacity. It controls the waste disposal ship so that it can move according to the schedule.

Referring to the control process in the shipI control and management unit 130 with reference to FIG. 6, the marine waste map generated through satellite images displays waste cluster.

When a marine waste reasoning map is generated that predicts that the predicted waste cluster will be partially separated at a specific time and a specific location due to the influence of ocean currents or winds in the nearby area, select a marine waste disposal ship suitable for collection (ship 1 or ship 2), when ship 2 is selected in consideration of travel distance, loading weight, etc., Ship 2 is scheduled to schedule the departure time, collection capacity, working time, moving time, etc. The ship 2 is controlled by the ship control and management unit 130.

Here, the control means providing a notification through a communication means so that the marine waste disposal ship can be moved according to a schedule.

Above, the marine waste disposal apparatus according to the embodiment of the present invention has been looked at. Hereinafter, a method for disposing marine waste, which is another aspect according to an embodiment of the present invention, will be described. However, the above and redundant descriptions are omitted.

The marine waste disposal method according to an embodiment of the present invention is performed by a marine waste treatment apparatus, and includes steps of receiving a satellite image, pre-processing the satellite image, recognizing waste from the satellite image, and generating a map of the marine waste, generating a marine waste inference map by receiving at least one piece of marine information selected from the group consisting of tide, temperature, seawater flow, and wave height information, and generating a schedule for a marine waste treatment vessel based on the marine waste inference map. Including, the step of controlling the marine waste treatment vessel may be further included.

Receiving the satellite image comprises receiving the satellite image directly from an artificial satellite or receiving the satellite image from a ground station.

As described above, the pre-processing of the satellite image is a process for processing the raw-data satellite image into a standard image, and may include a process of generating a utilization image that processes the standard image to suit the purpose.

The generating a marine waste map is a process of recognizing wastes, particularly waste communities, from satellite images and generating a marine waste map in which the locations and ranges of the waste groups are specified.

The generating the marine waste reasoning map is the marine information that is expected to move the marine waste from the marine information, tide information, temperature information, wind direction/speed information, seawater flow information, and wave height information that can be obtained from the marine information service system. This is the process of generating the marine waste reasoning map.

The step of generating the schedule of the marine waste disposal ship considers the location of the marine waste and the capacity of the marine waste estimated at a specific time by the marine waste reasoning map, and the information of the marine waste disposal ship, that is, the processing capacity, travel distance, and travel time.

Furthermore, the method may further comprise a process of indirectly controlling the marine waste disposal ship by providing departure, operation, and port arrival information to the marine waste disposal ship according to an actual schedule.

According to the marine waste disposal apparatus and method described above, marine waste, particularly floating waste, can be treated and collected more effectively, and a device and method that can contribute to the safety management of general ships are provided.

As described above, although the embodiments have been described with limited drawings, those skilled in the art can make various modifications and variations from the above description.

For example, the described techniques may be performed in an order different from the method described, and/or the components of the described system, structure, device, circuit, etc. may be combined or combined in a different form than the method described, or other components may be used. Or even if it is replaced or substituted by equivalents, appropriate results can be achieved.

Therefore, other implementations, other embodiments, and equivalents of the claims are within the scope of the following claims.

What is claimed is:

1. A marine waste disposal apparatus comprising:
   a satellite image processing unit configured to receive satellite images to identify and locate marine waste, and generate a map of marine waste;
   a waste change reasoning unit configured to receive at least one or more pieces of information selected from the group consisting of tide, temperature, wind direction/speed, seawater flow, and wave height information to reason changes in the marine waste map; and
   a ship control and management unit configured to control general ships and control waste disposal ships based on marine waste maps,
   wherein the ship control and management unit is further configured to:
   when a marine waste reasoning map that predicts that a waste cluster will be partially separated at a specific time and a specific location due to an influence of ocean currents or winds in a nearby area is generated, select, among the waste disposal ships, a marine waste disposal ship suitable for collection, in consideration of a travel distance and a loading weight;
   schedule one or more of a departure time, a collection capacity, a working time, and a moving time of the selected marine waste disposal ship; and
   control the selected marine waste disposal ship by transmitting an alerts to the selected marine waste.

2. The marine waste disposal apparatus of claim 1
   wherein the satellite image processing unit comprising;
   a pre-processing module that performs pre-processing on the received marine satellite image;
   an object recognition module that recognizes objects captured from marine satellite images; and
   a waste map generating module that generates the marine waste map using marine waste cluster information recognized through satellite images.

3. The marine waste disposal apparatus of claim 2,
   wherein the waste change reasoning unit comprising;
   an information receiving module for receiving at least one piece of marine information selected from a marine information group consisting of tidal information, temperature information, wind direction/speed information, seawater flow information, and wave height information predicted at a location of the marine waste from a marine information service system;
   a waste capacity reasoning module for reasoning a capacity of waste considering a waste accumulation area derived from the waste map; and
   a map change reasoning module for predicting a movement of wastes from the marine information received through the information receiving module and generating a changed marine waste reasoning map.

4. The marine waste disposal apparatus of claim 3,
   wherein the map change reasoning module generates the marine waste reasoning map by reasoning a movement path of the marine waste through deep learning using the satellite images.

5. A method of disposing marine waste using satellite image by a marine waste disposal apparatus comprising;
   receiving a satellite image;
   pre-processing the received satellite image;
   generating a map of marine waste by recognizing waste from satellite images;
   generating a marine waste reasoning map by receiving at least one ocean information selected from the group consisting of tide, temperature, wind direction/speed, seawater flow, and wave height information;
   when a marine waste reasoning map that predicts that a waste cluster will be partially separated at a specific time and a specific location due to an influence of ocean currents or winds in a nearby area is generated, selecting, among waste disposal ships, a marine waste disposal ship suitable for collection, in consideration of a travel distance and a loading weight;
   scheduling one or more of a departure time, a collection capacity, a working time, and a moving time of the selected marine waste disposal ship; and
   controlling the selected marine waste disposal ship by transmitting an alerts to the selected marine waste.

* * * * *